Oct. 19, 1937.  V. REICKS  2,096,380
MILKING STOOL
Original Filed Aug. 12, 1925
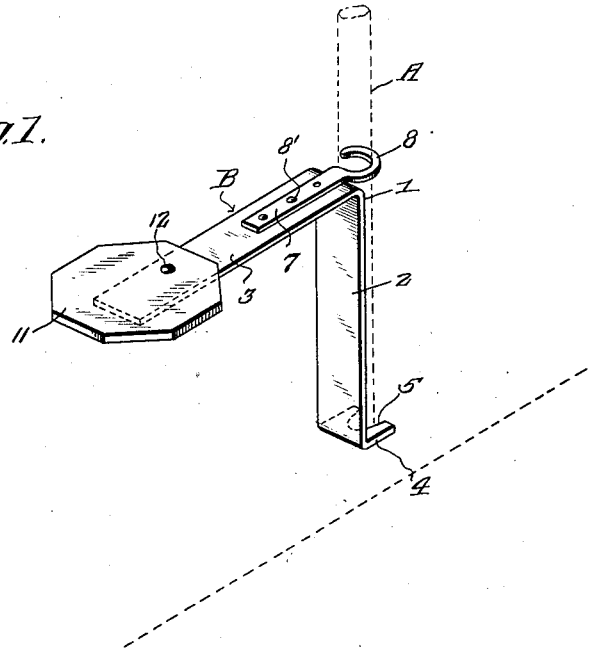
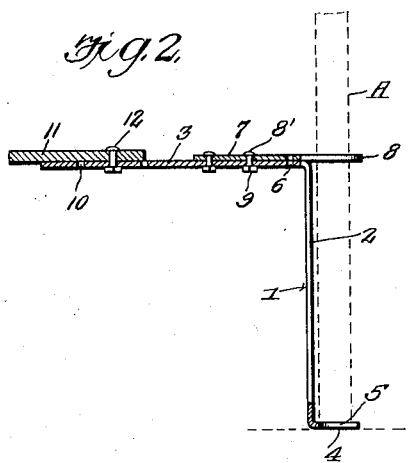
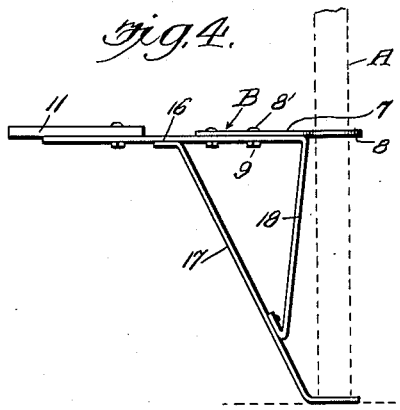
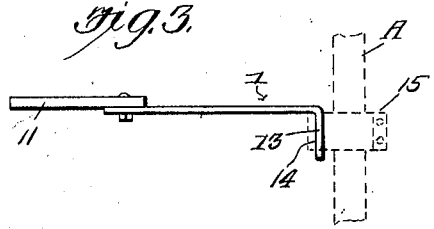
Inventor
Victor Reicks,
By John T. Duffie
Attorney Patented Oct. 19, 1937

2,096,380

UNITED STATES PATENT OFFICE 2,096,380

MILKING STOOL

Victor Reicks, Waucoma, Iowa

Refiled for abandoned application Serial No. 49,814, August 12, 1925. This application July 2, 1935, Serial No. 29,567. Renewed April 15, 1937

1 Claim. (Cl. 155—81)

This invention relates to new and useful improvements in milking stools, substantially as disclosed in my abandoned application, filed August 12, 1925, Ser. No. 49,814.

The primary object of my invention is to provide an easy swinging milk stool that may be readily adjusted to any movement of the cow to prevent accidental upsetting of the stool or milk pail.

A further object of my invention is to provide a milk stool which is simple and economical in construction and highly efficient and durable in use.

In the accompanying drawing, which is for illustrative purposes only and is therefore not drawn to scale:

Figure 1 is a perspective view, illustrating the application of my invention.

Figure 2 is a side elevation, partly in section.

Figure 3 is a side elevation of a modified form of my invention, and Figure 4 is a similar view of another modification.

Referring to the drawing for a more particular description of my invention, and in which drawing like parts are designated by like reference characters throughout the several views, A indicates the partition post of the stall and B my improved milking stool, as a whole. Specifically, my stool comprises a right-angularly bent frame 1 of spring steel or other suitable metal, consisting of the upright portion 2 and the horizontal seat supporting member 3. The lower end of the upright portion or member 2 is provided with an outwardly bent lug or tongue 4, formed with a recess 5, to snugly receive the lower end of the partition post A. The inner end of the horizontal member 3 of the frame 1, is provided with a longitudinal series of apertures 6, whereby the shank 7 of the hook 8, may be adjustably connected therewith by the bolts and nuts 8' and 9, respectively, and the outer end of the horizontal member 3 is provided with a longitudinal series of apertures 10, whereby the seat 11 of octagonal shape, may be adjustably and pivotally secured thereto by the bolts 12.

In the modified form of my invention illustrated in Figure 3, the frame 1 merely consists of a straight horizontal bar, formed at its inner end with a right-angularly bent depending portion or extension 13, which fits in a corresponding opening 14 in the clamp 15 which embraces the partition post.

In the modified form of my invention illustrated in Figure 4, the frame 1 is composed of two sections 16 and 17, the latter being disposed at an inclination and the two sections being connected together by the depending brace 18 formed by a continuation of the upper horizontal section 16.

From the foregoing description taken in connection with the drawing, it is thought that the construction, operation and advantages of my invention will be readily understood without requiring a more extended explanation.

Having described my invention, what I claim as new and desire to secure by Letters Patent, is:

A milking stool comprising a supporting frame constructed from a single flat resilient strip of metal and consisting of a vertically disposed member provided at its lower end with a right-angularly bent recessed post engaging lug and bent at right angles and in an opposite direction at its upper end to provide a horizontal seat supporting member, a seat pivotally and adjustably mounted on the seat supporting member of the frame and a separate hook whose shank is adjustably secured to the seat supporting member, the seat adapted to turn on the supporting frame and the frame adapted to swing in a horizontal plane in either direction with the partition post as a fulcrum.

VICTOR REICKS.